(12) United States Patent
Yamamoto et al.

(10) Patent No.: US 6,980,327 B2
(45) Date of Patent: Dec. 27, 2005

(54) IMAGE PROCESSING APPARATUS

(75) Inventors: Naofumi Yamamoto, Kawasaki (JP); Takahiro Fuchigami, Yokosuka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 918 days.

(21) Appl. No.: 09/860,574

(22) Filed: May 21, 2001

(65) Prior Publication Data

US 2002/0171854 A1  Nov. 21, 2002

(51) Int. Cl.$^7$ ............... G06F 15/00; G06F 1/00; G03F 3/08
(52) U.S. Cl. ............... 358/1.9; 358/529
(58) Field of Search ............... 358/1.9, 538, 529–530, 358/518–520, 515; 382/165, 167

(56) References Cited

U.S. PATENT DOCUMENTS 5,287,204 A  *  2/1994  Koizumi et al. ............ 358/538
5,583,646 A     12/1996  Yamamoto et al. ......... 358/296

FOREIGN PATENT DOCUMENTS

JP  7-123251  5/1995
JP  8-23455   1/1996

* cited by examiner

Primary Examiner—Kimberly Williams
Assistant Examiner—Charlotte M. Baker
(74) Attorney, Agent, or Firm—Foley & Lardner LLP

(57) ABSTRACT

In an image processing apparatus, a first recognition section recognizes a black character portion and a color character portion in CMY color signals input from a color conversion section, and outputs a recognition result to a third recognition section. A second recognition section recognizes a low-density region (including a white portion) and a narrow region surrounded by the low-density region in the CMY color signals input from the color conversion section as a low-density region, and outputs a recognition result to the third recognition section. The third recognition section synthesizes the recognition result from the first recognition section and the recognition result from the second recognition section, and delivers a resultant recognition signal to a filtering section, a black signal generating section and a tone processing section. The filtering section, black signal generating section and tone processing section execute processes in accordance with the recognition signal from the third recognition section.

5 Claims, 5 Drawing Sheets

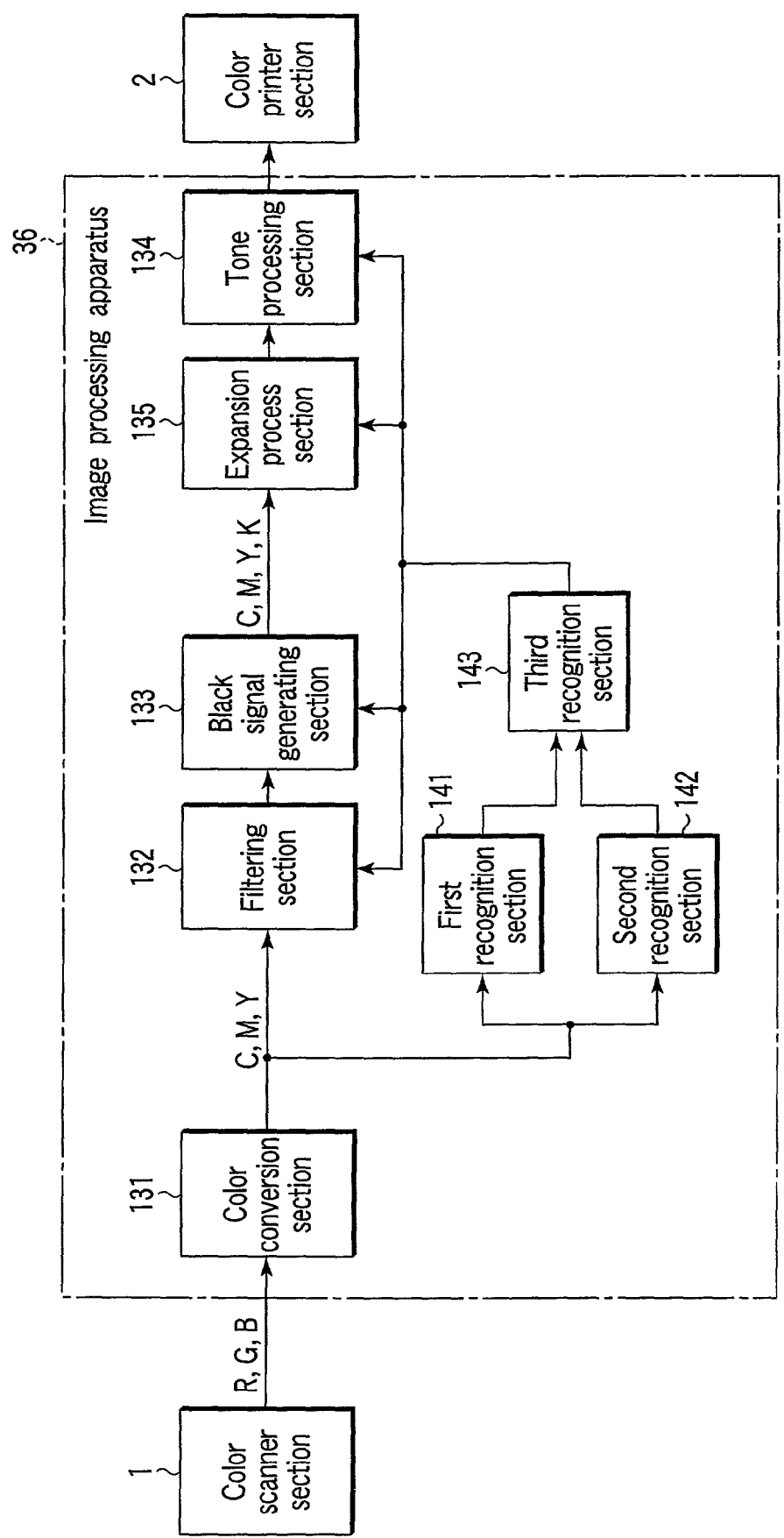
F I G. 6

IMAGE PROCESSING APPARATUS

BACKGROUND OF THE INVENTION

The present invention relates to a color image forming apparatus, and more particularly to an image processing apparatus for performing proper color reproduction in a digital color copying machine.

In a digital color copying machine, the reflectance of a color image on an original is read by color-separating each pixel into three colors of R (red), G (green) and B (blue), and the read result is converted to RGB three-color digital image data. The three-color digital image data is subjected to color correction processing, such as density conversion processing, filtering processing, black signal generation processing and tone processing, thereby producing four-color digital image density data of C (cyan), M (magenta), Y (yellow) and K (black).

Based on the four-color digital image density data, a dot image, which is a digital image, is recorded on copying paper.

In a conventional digital copying machine or printer, when a black character is to be recorded, one black color material is used. The reason is that if plural color materials are used to record a black character, chromatic blur will occur around the black character due to displacement among the color materials, and such chromatic blur needs to be prevented.

However, in a method of recording a black character by uniformly using one black color material, when a black character is to be recorded on a colored background, a white portion will occur around the character due to displacement of color materials and this will degrade the image quality. The higher the density of the background, the greater the degradation in image quality.

BRIEF SUMMARY OF THE INVENTION

The object of the present invention is to provide an image processing apparatus capable of preventing a degradation in image quality due to displacement of color materials in either case of recording a black character on a colored background or recording it on a white background.

In order to achieve the object, the present invention provides an image processing apparatus for processing a color image signal input by reading a color image on an original, the apparatus comprising: first recognition means for recognizing a character or a line image region in the color image signal; second recognition means for recognizing continuous low-density regions in the color image signal; and third recognition means for outputting a recognition signal by synthesizing a recognition result of the first recognition means and a recognition result of the second recognition means.

The invention provides an image processing apparatus for processing a plurality of color image signals input by reading a color image on an original, the apparatus comprising: conversion means for converting the plural color image signals to plural color signals; recognition means for recognizing the kind of a pixel or a region in the plural color signals converted by the conversion means; first processing means for processing the plural color signals converted by the conversion means, and outputting a black color signal and plural color signals; second processing means for processing the plural color signals converted by the conversion means, and outputting a black color signal and plural color signals; and selecting means for selecting the output signals processed by the first processing means or the output signals processed by the second processing means, in accordance with a recognition signal from the recognition means.

The invention provides an image processing apparatus and method for processing a plurality of color image signals input by reading a color image on an original, the apparatus comprising: conversion means for converting the plural color image signals to plural color signals; recognition means for recognizing the kind of a pixel of interest or a region in the plural color signals converted by the conversion means; processing means for converting and processing a signal value of the pixel of interest by referring to signal values of peripheral pixels of the pixel of interest in the color signals converted by the conversion means; and selection means for selecting the signal value converted and processed by the processing means or the signal value of the pixel of interest, in accordance with a recognition signal from the recognition means.

The invention provides an image processing apparatus for processing a plurality of color image signals input by reading a color image on an original, the apparatus comprising: conversion means for converting the plural color image signals to plural color signals; first recognition means for recognizing a character or a line image region in the plural color signals converted by the conversion means; second recognition means for recognizing continuous low-density regions in the plural color signals converted by the conversion means; third recognition means for performing recognition by synthesizing a recognition result of the first recognition means and a recognition result of the second recognition means; first processing means for processing the plural color signals converted by the conversion means, and outputting plural color signals including a black color signal; second processing means for processing the plural color signals converted by the conversion means, and outputting plural color signals including a black color signal; and selecting means for selecting the output signals processed by the first processing means or the output signals processed by the second processing means, in accordance with a recognition signal from the third recognition means.

The invention provides an image processing apparatus for processing a plurality of color image signals input by reading a color image on an original, the apparatus comprising: conversion means for converting the plural color image signals to plural color signals; first recognition means for recognizing a character or a line image region in the plural color signals converted by the conversion means; second recognition means for recognizing continuous low-density regions in the plural color signals converted by the conversion means; third recognition means for performing recognition by synthesizing a recognition result of the first recognition means and a recognition result of the second recognition means; processing means for converting and processing a signal value of a pixel of interest by referring to signal values of peripheral pixels of the pixel of interest in the color signals converted by the conversion means; and selection means for selecting the signal value converted and processed by the processing means or the signal value of the pixel of interest, in accordance with a recognition signal from the third recognition means.

BRIEF DESCRIPTION OF THE SEVERAL VIEWS OF THE DRAWING

FIG. 6 is a block diagram schematically showing the structure of an image processing apparatus according to a second embodiment.

DETAILED DESCRIPTION OF THE INVENTION

Embodiments of the present invention will now be described with reference to the accompanying drawings.

Figure 1:
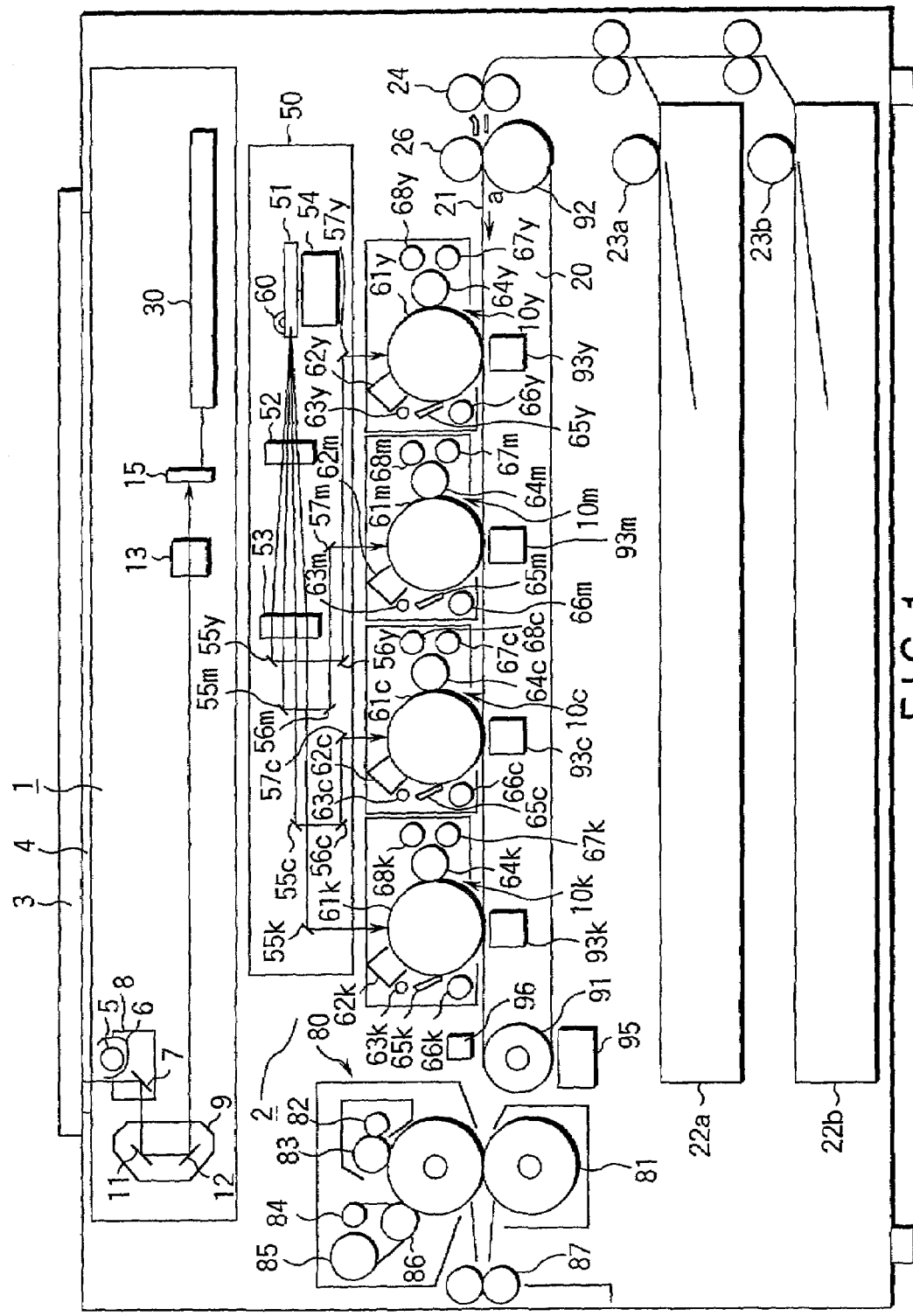
FIG. 1 schematically shows an internal structure of a color image forming apparatus according to the present invention, such as a digital color copying machine, for forming a copy image of a color image.

FIG. 1 schematically shows an internal structure of a color image forming apparatus according to the present invention, such as a digital color copying machine, for forming a copy image of a color image. In general terms, the color image forming apparatus comprises a color scanner section 1 serving as image reading means for reading a color image on an original, and a color printer section 2 serving as image forming means for forming a copy image of the read color image.

The color scanner section 1 has an original table cover 3 on its upper part, and an original table 4 formed of transparent glass and disposed to face the original table cover 3 in the closed state. An original is placed on the original table 4. Below the original table 4, there are provided an exposure lamp 5 for illuminating the original placed on the original table 4; a reflector 6 for converging light from the exposure lamp 5 onto the original; and a first mirror 7 for deflecting the reflection light from the original to the left in the figure. The exposure lamp 5, reflector 6 and first mirror 7 are fixed to a first carriage 8. The first carriage 8 is driven by a pulse motor (not shown) by means of a toothed belt (not shown), etc. so that the first carriage 8 may be moved in parallel along the lower surface of the original table 4.

A second carriage 9 is disposed on the left side (in the figure) of the first carriage 8, that is, on the side to which reflection light from the first mirror 7 is guided. The second carriage 9 is movable in parallel to the original table 4 by means of a drive mechanism (not shown) (e.g. a toothed belt and a DC motor). The second carriage 9 comprises a second mirror 11 for downwardly (in the figure) deflecting the reflection light from the original which has been guided by the first mirror 7, and a third mirror 12 for deflecting the reflection from the second mirror 11 to the right in the figure. The second mirror 11 and third mirror 12 are disposed at right angles to each other. The second carriage 9 follows the movement of the first carriage 8 and moves in parallel to the original table 4 at a speed equal to half the speed of the first carriage 8.

A focusing lens 13 for focusing the reflection light from the third mirror 12 at a predetermined magnification is disposed in a plane including an optical axis of the light deflected by the second and third mirrors 11 and 12. A CCD color image sensor (photoelectric conversion element) 15 for converting the reflection light converged by the focusing lens 13 to an electric signal is disposed in a plane substantially perpendicular to the optical axis of the light traveling through the focusing lens 13. The output from the CCD color image sensor 15 is connected to a main control section 30 (to be described later).

If light from the exposure lamp 5 is converged onto the original placed on the original table 4 by means of the reflector 6, the reflection light from the original is made incident on the color image sensor 15 via the first mirror 7, second mirror 11, third mirror 12 and focusing lens 13. The color image sensor 15 converts the incident light to electric signals of the three primary colors, R (red), G (green) and B (blue).

The color printer section 2 has first to fourth image forming units 10y, 10m, 10c and 10k for producing images of four colors, yellow (Y), magenta (M), cyan (C) and black (K), which are color-separated according to a well-known subtractive color mixing process.

A convey mechanism 20 is disposed below the image forming units 10y, 10m, 10c and 10k. The convey mechanism 20 includes a convey belt 21 serving as convey means for conveying color images produced by the respective image forming units in a direction indicated by an arrow a. The convey belt 21 is passed between a driving roller 91 rotated by a motor (not shown) in the direction of arrow a and a driven roller 92 disposed apart from the driving roller 91 by a predetermined distance. The convey belt 21 is endlessly run in the direction of arrow a at a fixed speed. The image forming units 10y, 10m, 10c and 10k are arranged in tandem in the direction of conveyance of the convey belt 21.

Each of the image forming units 10y, 10m, 10c and 10k includes a photosensitive drum 61y, 61m, 61c, 61k serving as an image carrying body. The photosensitive drums 61y, 61m, 61c and 61k have outer peripheral surfaces which are rotatable in the same direction at points of contact with the convey belt 21. The photosensitive drums 61y, 61m, 61c and 61k are rotated by a motor (not shown) at a predetermined speed.

The photosensitive drums 61y, 61m, 61c and 61k are disposed to have their axes arranged at regular intervals from one another and in a direction perpendicular to the direction in which images are conveyed by the convey belt 21. In the description below, assume that the axial direction of each photosensitive drum 61y, 61m, 61c, 61k is referred to as a main scan direction (second direction), and the rotational direction of each photosensitive drum 61y, 61m, 61c, 61k, that is, the direction of running of the convey belt 21 (the direction of arrow a), is referred to as a sub-scan direction (first direction).

Around each of the photosensitive drum 61y, 61m, 61c and 61k, the following elements are disposed in order in the rotational direction: a charging device 62y, 62m, 62c, 62k serving as charging means, extended in the main scan direction; a destaticizer 63y, 63m, 63c, 63k; a developing roller 64y, 64m, 64c, 64k serving as developing means, similarly extended in the main scan direction; a lower stirring roller 67y, 67m, 67c, 67k; an upper stirring roller 68y, 68m, 68c, 68k; a transfer device 93y, 93m, 93c, 93k serving as transfer means, similarly extended in the main scan direction; a cleaning blade 65y, 65m, 65c, 65k similarly extended in the main scan direction; and a waste toner recovering screw 66y, 66m, 66c, 66k.

Each transfer device 93y, 93m, 93c, 93k is disposed at such a position as to sandwich the convey belt 21 between itself and the photosensitive drum 61y, 61m, 61c, 61k, that is, inside the convey belt 21. In addition, an exposure point by an exposure device 50 (to be described later) is formed on that portion of the outer peripheral surface of each photosensitive drum 61y, 61m, 61c, 61k, which lies between the charging device 62y, 62m, 62c, 62k and the developing roller 64y, 64m, 64c, 64k.

Sheet cassettes 22a, 22b containing paper sheets P as image formation media, on which images formed by the image forming units 10y, 10m, 10c, 10k are to be transferred, are disposed below the convey mechanism 20.

A pick-up roller 23a, 23b is disposed at one end of each of the sheet cassettes 22a, 22b and on a side close to the driven roller 92. The pick-up roller 23a, 23b picks up sheets P one by one from the uppermost one from the sheet cassette 22a, 22b. Register rollers 24 are disposed between the pickup rollers 23a, 23b and the driven roller 92. The register rollers 24 register and align a leading edge of the sheet P picked up from the sheet cassette 22a, 22b with a leading edge of a y-toner image formed on the photosensitive drum 61y of the image forming unit 10y.

Toner images formed on the other photosensitive drums 61m, 61c and 61k are brought to respective transfer positions in accordance with the transfer timing of the sheet P conveyed on the convey belt 21.

An attraction roller 26 for providing an electrostatic attraction force to the sheet P conveyed at the predetermined timing via the register rollers 24 is disposed between the register rollers 24 and the first image forming unit 10y, and near the driven roller 92, that is, substantially over the outer peripheral surface of the driven roller 92 with the convey belt 21 interposed. The axis of the attraction roller 26 and the axis of the driven roller 92 are set to be parallel to each other.

A position error sensor 96 for sensing a position of the image formed on the sheet P on the convey belt 21 is disposed in a region at one end of the convey belt 21, and near the driving roller 91, that is, substantially over the outer peripheral surface of the driving roller 91 with the convey belt 21 interposed. The position error sensor 96 comprises, for example, a light transmission type or a light reflection type optical sensor.

A convey belt cleaning device 95 for removing toner adhering to the convey belt 21 or paper dust of the sheet P is disposed at the outer peripheral surface of the driving roller 91, in contact with the convey belt 21 on the downstream side of the position error sensor 96.

A fixing device 80 is disposed in a region to which the sheet P conveyed by the convey belt 21 and separated from the driving roller 91 is delivered. The fixing device 80 heats the sheet P at a predetermined temperature, melts the toner image transferred on the sheet P, and fixes the toner image on the sheet P. The fixing device 80 comprises a heat roller pair 81, oil apply rollers 82 and 83, a web winding roller 84, a web roller 85, and a web press roller 86. The toner on the sheet P is fixed and the sheet P with the fixed toner image is discharged by a discharge roller pair 87.

The exposure device 50 forms color-separated electrostatic latent images on outer peripheral surfaces of the respective photosensitive drums 61y, 61m, 61c and 61k. The exposure device 50 has a semiconductor laser 60. The light emission from the semiconductor laser 60 is controlled on the basis of image data (y, m, c, k) of respective colors separated by an image processing apparatus 63 (to be described below). A polygon mirror 51 rotated by a polygon motor 54 to reflect and scan laser beams and fθ lenses 52 and 53 for focusing the laser beams reflected by the polygon mirror 51 by correcting their focal points are disposed in the named order along the optical path of the semiconductor laser 60.

First deflection mirrors 55y, 55m, 55c and 55k for deflecting the respective color laser beams emanating from the fθ lens 53 toward the exposure points on the photosensitive drums 61y, 61m, 61c and 61k, and second and third deflection mirrors 56y, 56m, 56c, 57y, 57m and 57c for further deflecting the laser beams deflected by the first deflection mirrors 55y, 55m and 55c are disposed between the fθ lens 53 and the photosensitive drums 61y, 61m, 61c and 61k.

The laser beam for black is deflected by the first deflection mirror 55k and then directly guided to the photosensitive drum 61k without intervention of other mirrors.

Figure 2:
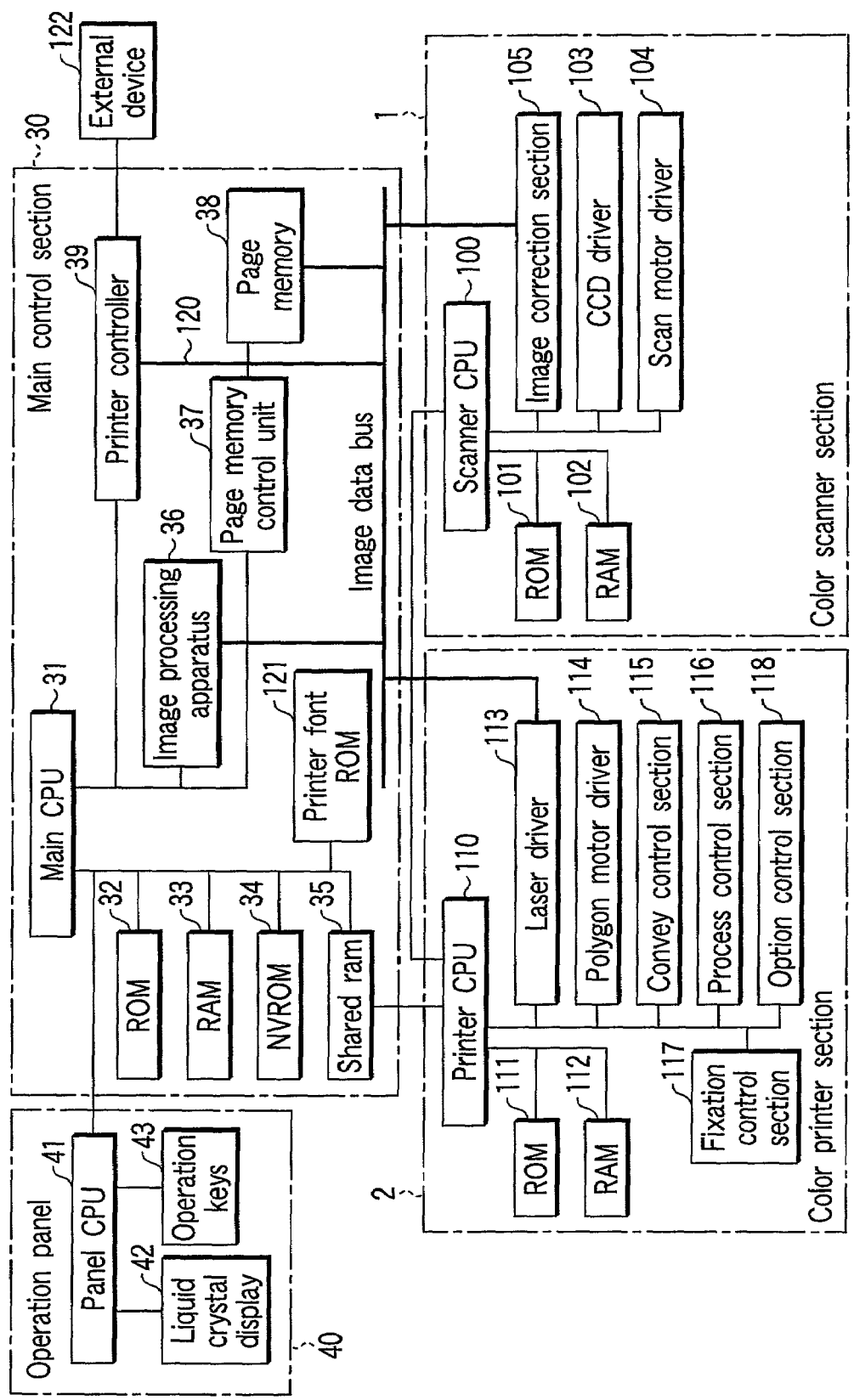
FIG. 2 is a block diagram schematically illustrating electrical connection in the color image forming apparatus shown in FIG. 1, and a flow of signals for control.

FIG. 2 is a block diagram schematically showing electrical connection of the digital copying machine shown in FIG. 1 and flow of signals for control. In FIG. 2, a control system comprises three CPUs (Central Processing Units): a main CPU 31 provided in the main control section 30; a scanner CPU 100 in the color scanner section 1; and a printer CPU 110 in the color printer section 2.

The main CPU 31 performs bi-directional communication with the printer CPU 110 via a shared RAM (Random Access Memory) 35. The main CPU 31 issues an operational instruction, and the printer CPU 110 returns status data. Serial communication is performed between the printer CPU 110 and scanner CPU 100. The printer CPU 110 issues an operational instruction, and the scanner CPU 100 returns status data.

An operation panel 40 comprises a liquid crystal display 42, various operation keys 43 and a panel CPU 41 to which these are connected. The operation panel 40 is connected to the main CPU 31.

The main control section 30 comprises the main CPU 31, a ROM (Read-Only Memory) 32, a RAM 33, an NVRAM 34, shared RAM 35, image processing apparatus 36, a page memory control unit 37, a page memory 38, a printer controller 39, and a printer font ROM 121.

The main CPU 31 controls the entirety of the main control section 30. The ROM 32 stores control programs, etc. The RAM 33 temporarily stores data.

The NVRAM (Non-Volatile RAM) 34 is a non-volatile memory backed up by a battery (not shown), and even when power is not supplied, stored data is maintained.

The shared RAM 35 is used to perform bi-directional communication between the main CPU 31 and printer CPU 110.

The page memory control unit 37 stores and read out image information in and from the page memory 38. The page memory 38 has areas capable of storing image information of a plurality of pages. The page memory 38 can store compressed data in units of a page, which is obtained by compressing image information from the color scanner section 1.

The printer font ROM 121 stores font data corresponding to print data. The printer controller 39 develops print data, which is sent from an external device 122 such as a personal computer, into image data using the font data stored in the printer font ROM 121 with a resolution corresponding to resolution data added to the print data.

The color scanner section 1 comprises the scanner CPU 100 for controlling the entirety of the color scanner section 1; a ROM 101 storing control programs, etc.; a data storage RAM 102; a CCD driver 103 for driving the color image sensor 15; a scan motor driver 104 for controlling the rotation of a scan motor for moving the first carriage 8, etc.; and an image correction section 105.

The image correction section 105 comprises an A/D converter for converting R-, G- and B-analog signals output from the color image sensor 15 to digital signals; a shading correction circuit for correcting a variance in the color image sensor 15 or a variation in threshold level due to ambient temperature variation relative to the output signal from the color image sensor 15; and a line memory for temporarily storing shading-corrected digital signals from the shading correction circuit.

The color printer section 2 comprises the printer CPU 110 for controlling the entirety of the color printer section 2; a ROM 111 storing control programs, etc.; a data storage RAM 112; a laser driver 113 for driving the semiconductor laser 60; a polygon motor driver 114 for driving the polygon motor 54 of the exposure device 50; a convey control section 115 for controlling conveyance of the sheet P by the convey mechanism 20; a process control section 116 for controlling charging, developing and transferring processes using the charging device, developing roller and transfer device; a fixation control section 117 for controlling the fixing device 80; and an option control section 118 for control options.

The image processing apparatus 36, page memory 38, printer controller 39, image correction section 105 and laser driver 113 are connected over an image data bus 120.

Figure 3:
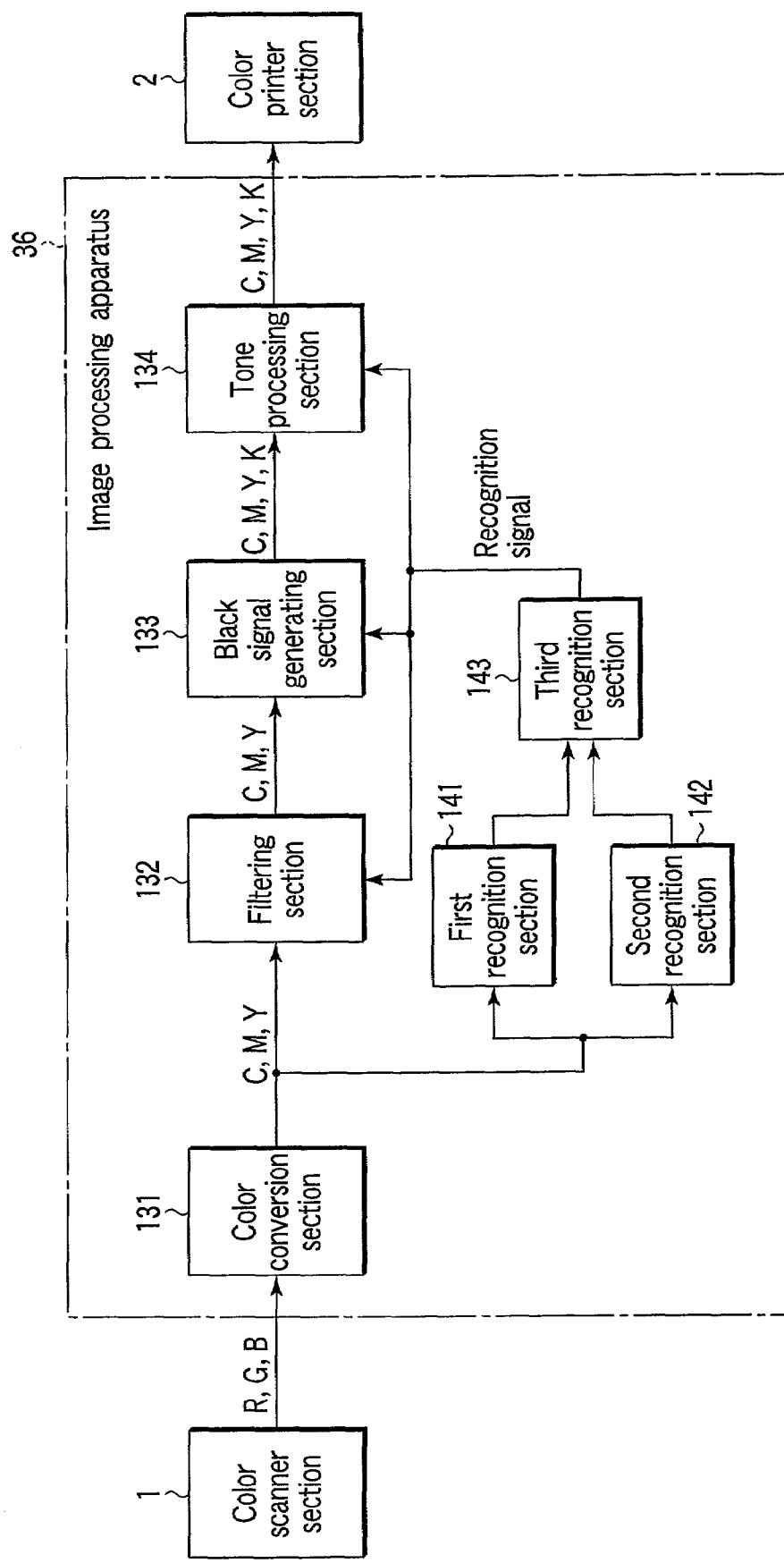
FIG. 3 is a block diagram schematically showing the structure of an image processing apparatus according to a first embodiment.

FIG. 3 schematically shows the structure of the image processing apparatus 36 according to a first embodiment. In FIG. 3, image data R (red), G (green) and B (blue) output from the color scanner section 1 is sent to a color conversion section 131 of the image processing apparatus 36. The color conversion section 131 converts the input image data R, G, B to color signals of C (cyan), M (magenta) and Y (yellow).

The CMY color signals from the color conversion section 131 are sent to a filtering section 132, a first recognition section 141 and a second recognition section 142.

The filtering section 132 filters the input CMY color signals in accordance with an input recognition signal, and outputs the filtered result to a black signal generating section 133.

Based on the input CMY color signal and recognition signal, the black signal generating section 133 generates a K (black) color signal, and outputs the CMYK color signals to a tone processing section 134.

Based on the input recognition signal, the tone processing section 134 subjects the input CMYK color signals to, e.g. an error dispersion method in accordance with the number of recordable bits of the color printer section 2, and delivers the output to the color printer section 2.

On the other hand, the first recognition section 141 recognizes a black character portion and a color character portion (character or line image region) in the input CMY color signals, and delivers the recognition result to the third recognition section 143. There are many conventional recognition methods applicable to the first recognition section 141, and conventional methods are used in the present embodiment. For example, a portion with a great density variation in the CMY color signal is recognized as a character portion, and further a portion with a high density and a low chroma in the character portion is recognized as a black character portion.

The second recognition section 142 recognizes a low-density region (including a white region) and a narrow region surrounded by the low-density region in the input CMY color signal as a low-density region. The recognition result is output to the third recognition section 143.

The third recognition section 143 synthesizes the recognition result from the first recognition section 141 and the recognition result from the second recognition section 142. The synthesized result is output to the filtering section 132, black signal generating section 133 and tone processing section 134. For example, synthesizing the recognition result from the first recognition section 141 and the recognition result from the second recognition section 142, the third recognition section 143 outputs recognition signals representing the following recognition results 1–4.

1. If a recognition result from the first recognition section 141 is "black character" and a recognition result from the second recognition section 142 is "low-density region", the third recognition section 143 outputs a recognition signal representing a recognition result "black character on a low-density background."

2. If a recognition result from the first recognition section 141 is "black character" and a recognition result from the second recognition section 142 is "other than low-density region", the third recognition section 143 outputs a recognition signal representing a recognition result "black character on a high-density background."

3. If a recognition result from the first recognition section 141 is "color character," the third recognition section 143 outputs a recognition signal representing a recognition result "color character," irrespective of the recognition result from the second recognition section 142.

4. If a recognition result from the first recognition section 141 is "other than character," the third recognition section 143 outputs a recognition signal representing a recognition result "other than character," irrespective of the recognition result from the second recognition section 142.

In accordance with the recognition signal from the third recognition section 143, the filtering section 132 switches the filter so as to record the character portion with sharpness. Specifically, in the cases of the recognition signals representing the recognition results 1 to 3, a high-level edge emphasis filter process is performed. In the case of the recognition signal representing the recognition result 4, a low-level edge emphasis filter process is performed.

Figure 4:
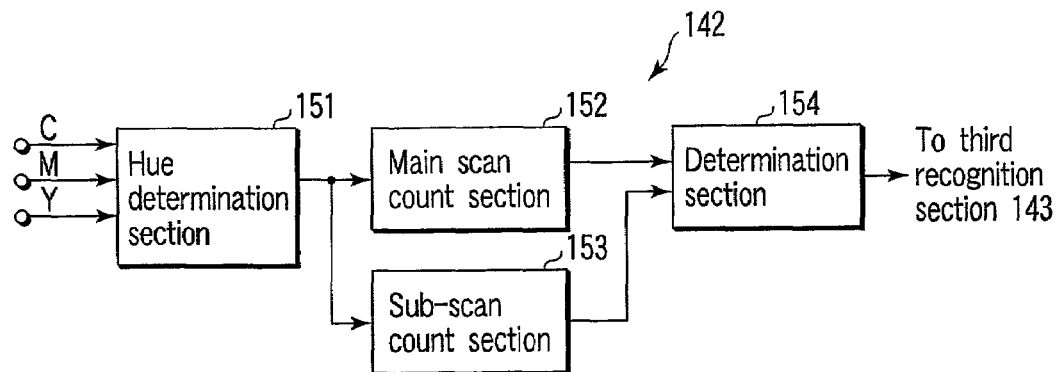
FIG. 4 shows an example of the structure of a second recognition section according to the invention.

FIG. 4 shows an example of the structure of the second recognition section 142 according to the invention. The second recognition section 142 comprises a hue determination section 151 for determining whether the input CMY color signal (per pixel) is associated with a low-density portion or a high-density portion, and whether it is associated with an achromatic color or a chromatic color; a main scan count section 152 for counting up low-density region pixels in the main scan direction, on the basis of the determination result from the hue determination section 151; a sub-scan count section 153 for counting up low-density region pixels in the sub-scan direction, on the basis of the determination result from the hue determination section 151; and a determination section 154 for determining whether the scanned region is a low-density region, on the basis of the count result of the main scan count section 152 and the count result of the sub-scan count section 153.

The hue determination section 151 determines whether the input CMY color signal is associated with a low-density portion or a high-density portion, and whether it is associated with an achromatic color (white, gray, black) or a chromatic color. The hue determination section 151 outputs the determination result to the main scan count section 152 and the sub-scan count section 153.

For example, one of X, Y and Z below is determined:
X. Low density (white or pale color)
Y. Black
Z. Other than X and Y.

Based on the determination result input from the hue determination section 151, the main scan count section 152 discriminates a continuous "X" region. If the determination result is "X", the main scan count section 152 counts up. If the determination result is "Z", the main scan count section 152 counts down. Accordingly, the count value increases with respect to a low-density region (X) wide in the main scan direction, and the count value decreases with respect to other regions.

Similarly, based on the determination result input from the hue determination section 151, the sub-scan count section 153 discriminates a continuous "X" region. If the determination result is "X", the sub-scan count section 153 counts up. If the determination result is "Z", the sub-scan count section 153 counts down. Accordingly, the count value increases with respect to a low-density region (X) wide in the sub-scan direction, and the count value decreases with respect to other regions.

If either the count result input from the main scan count section 152 or the count result input from the sub-scan count section 153 has a predetermined value or more, the determination section 154 determines that the scanned region is included in a low-density region, and outputs the determination result to the third recognition section 143.

The second recognition section 142 has the above-described structure. Alternatively, a pre-scanned color image signal is stored in the page memory 38, and the main CPU 31 outputs the signal to the third recognition section 143, based on recognition by software using programs stored in the ROM 32. In short, it should suffice if it is recognized whether the scanned region is included in a low-density region or not.

Figure 5:
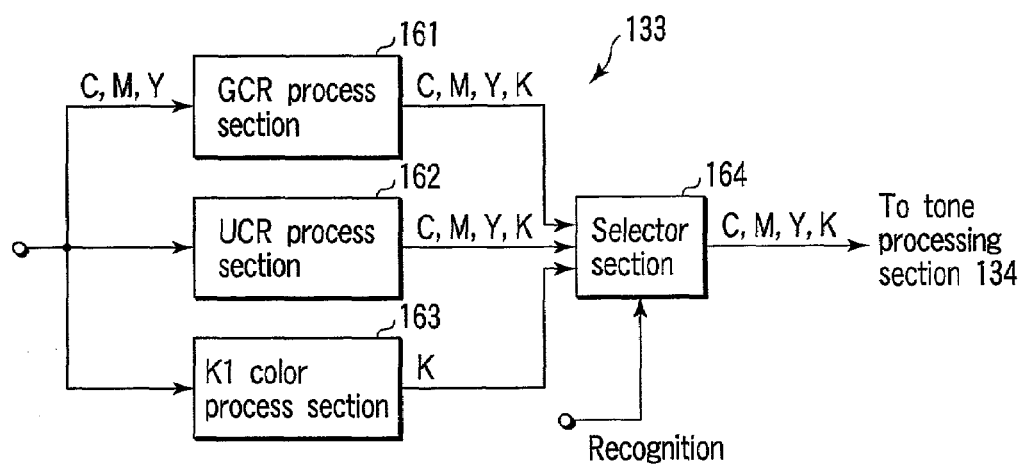
FIG. 5 shows an example of the structure of a black signal generating section according to the invention.

FIG. 5 shows an example of the structure of the black signal generating section 133 according to the invention. The black signal generating section 133 comprises a GCR process section 161 for subjecting the input CMY color signals to a GCR (Gray Component Replacement) process, thereby outputting CMYK color signals; a UCR process section 162 for subjecting the input CMY color signals to a UCR (Under Color Removable) process, thereby outputting CMYK color signals; a K1 color process section 163 for subjecting the input CMY color signals to a K1 color process, thereby outputting only a K (black) color signal; and a selector section 164 for selecting the CMYK color signals from the GCR process section 161, the CMYK color signals from the UCR process section 162, or the K color signal from the K1 color process section 163, in accordance with the recognition signal from the third recognition section 143.

The GCR process section 161 performs arithmetic operations based on the input CMY color signals according to the following equations and outputs CMYK color signals:

$$K=\min(C, M, Y)$$

$$C=(C-K)/(1-K)$$

$$M=(M-K)/(1-K)$$

$$Y=(Y-K)/(1-K)$$

The UCR process section 162 performs arithmetic operations based on the input CMY color signals according to the following equations and outputs CMYK color signals:

$$K=\min(C, M, Y)$$

$$C=C-K$$

$$M=M-K$$

$$Y=Y-K$$

The K1 color process section 163 performs arithmetic operations based on the input CMY color signals according to the following equations and outputs CMYK color signals:

$$K=(C, M, Y)/3$$

$$C=0$$

$$M=0$$

$$Y=0$$

In this manner, the CMY amount is less in the UCR process than in the GCR process, and the CMY amount is less in the K1 color process than in the UCR process. Thus, the amount of "K" increases relatively.

The selector section 164 selects the CMYK color signals output from the three process sections (161, 162, 163) in accordance with the recognition signal from the third recognition section 143, and delivers the selected signals to the tone processing section 134. Specifically, the selector section 164 switches (selects) the output of the CMYK color signals in accordance with the following rules a to d.

a. In the case of a black character on a low-density background, the CMYK color signals from the K1 color process section 163 are selected. Since the CMY color signals are "0", the K (black) color signal alone is actually output.

b. In the case of a black character on a high-density background, the CMYK color signals from the UCR process section 162 are selected.

c. In the case of a color character, the CMYK color signals from the GCR process section 161 are selected.

d. In the case of an image other than characters, the CMYK color signals from the GCR process section 161 are selected.

For example, in the case of a black character on a high-density background, the CMYK color signals from the UCR process section 162 are selected. Thereby, C, M and Y are mixed and a white portion is prevented from occurring due to displacement of color materials.

In the above choice (c), the CMYK color signals from the GCR process section 161 are selected. Alternatively, the CMYK color signals from the UCR process section 162 may be selected. In short, it should suffice if the degradation in image quality is prevented.

The operation of the image processing apparatus 36 of the first embodiment having the above structure will now be described with reference to FIGS. 3 to 5.

The color conversion section 131 converts the input image data R, G, B from the color scanner section 1 to CMY color signals, and outputs them to the filtering section 132, first recognition section 141 and second recognition section 162.

The first recognition section 141 discriminates a black character portion or a color character portion in the CMY color signals input from the color conversion section 131, and delivers the discrimination result to the third recognition section 143.

In the second recognition section 142, the hue determination section 151 determines whether the CMY color signal input from the color conversion section 131 is associated with a low-density portion or a high-density portion, and whether it is associated with an achromatic color (white, gray, black) or a chromatic color (low-density black, or neither low-density nor black). The determination result is output to the main scan count section 152 and the sub-scan count section 153.

If the determination result input from the hue determination section 151 is "low-density", the main scan count section 152 counts up. If the determination result is "neither low-density nor black", the main scan count section 152 counts down. The count result is output to the determination section 154. Similarly, if the determination result input from the hue determination section 151 is "low-density", the sub-scan count section 153 counts up. If the determination result is "neither low-density nor black", the sub-scan count section 153 counts down. The count result is output to the determination section 154.

If either the count result input from the main scan count section 152 or the count result input from the sub-scan count section 153 has a predetermined value or more, the determination section 154 determines that the scanned region is included in a low-density region, and outputs the determination result to the third recognition section 143.

The third recognition section 143 synthesizes the recognition result from the first recognition section 141 and the recognition result from the second recognition section 142, and outputs a recognition signal representing the synthesized recognition result. There are four kinds of recognition signals which respectively represent "black character on low-density background," "black character on high-density background," "color character," and "other than characters." One of these four recognition signals is output to the filtering section 132, black signal generating section 133 and tone processing section 134.

The filtering section 132 filters the CMY color signals input from the color conversion section 131 in accordance with the recognition signal input from the third recognition section 143, and outputs the filtered result to the black signal generating section 133.

In the black signal generating section 133, the GCR process section 161 subjects the CMY color signals input from the filtering section 132 to the GCR process, thereby outputting CMYK color signals to the selector section 164. The UCR process section 162 subjects the input CMY color signals input from the filtering section 132 to the UCR process, thereby outputting CMYK color signals to the selector section 164. The K1 color process section 163 receives the CMY color signals input from the filtering section 132 and outputs only the K color signal to the selector section 164.

The selector section 164 selects the CMYK color signals from the GCR process section 161, the CMYK color signals from the UCR process section 162, or the K color signal from the K1 color process section 163, in accordance with the recognition signal from the third recognition section 143. The selected signals are output to the tone processing section 134.

In accordance with the recognition signal input from the third recognition section 143, the tone processing section 134 delivers the CMYK color signals from the selector section 164 to the color printer section 2 in accordance with the number of recordable bits of the color printer section 2.

A second embodiment will now be described.

FIG. 6 schematically shows the structure of the image processing apparatus according to the second embodiment. The structural elements common to those in the first embodiment are denoted by like reference numerals, and a description thereof is omitted. The second embodiment differs from the first embodiment in that an expansion process section 135 is provided between the black signal generating section 133 and tone processing section 134 in the first embodiment.

The expansion processing section 135 expands (thickens) a black character region.

Figure 7:
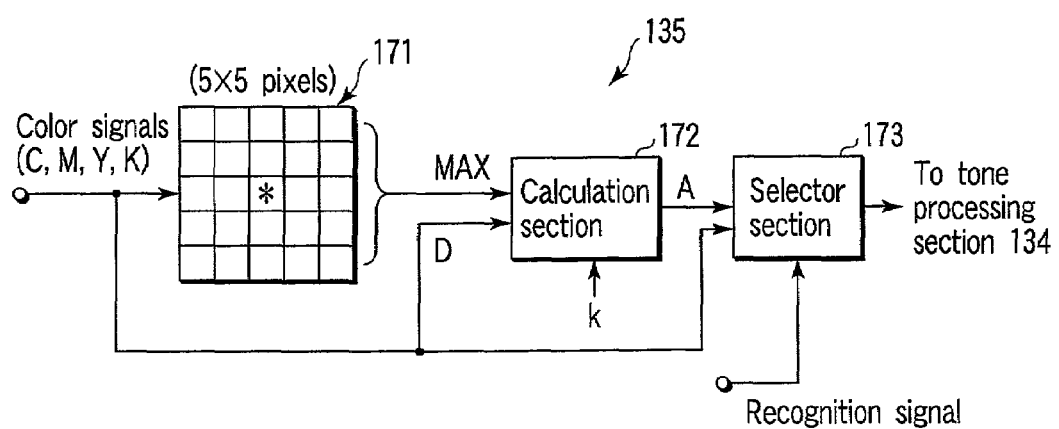
FIG. 7 shows an example of the structure of an expansion process section according to this embodiment.

FIG. 7 shows an example of the structure of the expansion process section 135 according to the present embodiment. The expansion process section 135 comprises a filtering section 171 having 5×5 pixels, a calculation section 172 and a selector section 173. Alternatively, the filtering section 171 may have 7×7 pixels, if the expansion process can be effectively performed. The expansion process section 135 is provided for each of the CMYK color signals, and thus the number of expansion process sections 135 is four, i.e. an expansion process section for a C color signal, an expansion process section for an M color signal, an expansion process section for a Y color signal, and an expansion process section for a K color signal.

The filtering section 171 calculates a maximum value MAX of a 5×5 pixel region surrounding a pixel of interest (*). This means that the color signal (C, M, Y, K) is expanded by two pixels in the vertical and horizontal directions.

The calculation section 172 calculates A=k×MAX+(1−k)×D,

Wherein A is a calculation result of the color signal (C, M, Y, K), k is a constant set for each color signal, MAX is a maximum value of the 5×5 pixel region surrounding a pixel of interest, and D is a value of the pixel of interest of the color signal (C, M, Y, K).

In the above calculation, the value of the pixel of interest and the expansion result are added with a weight of ratio "k". This means that the degree of expansion is controlled by the constant k. Specifically, when k=1, the expansion result is output. When k=0, the value of the pixel of interest (i.e. non-expanded color signal) is output. When k takes a value between 0 and 1, an intermediate value between the expansion result and non-expansion result is output. Accordingly, the degree of expansion can be controlled by the value of k. The value of k is set by the main CPU 31. In this case, the value prestored in the ROM 32 may be read out and set.

The value of k differs at least between the CMY color signals and the K color signal. Accordingly, the calculation section 172 executes at least two different calculations (conversion processing for the pixel of interest).

In accordance with the recognition signal from the third recognition section 143, the selection section 173 effects switching (selection) between the expansion result from the calculation section 172 and the value of the pixel of interest. Specifically, the expansion result is selected for the black character region on the high-density background, and the value of the pixel of interest is selected for other regions. Thereby, the background region can be expanded only for the black character on the high-density background.

The operation of the image processing apparatus 36 of the second embodiment having the above structure will now be described with reference to FIG. 6. As is shown in FIG. 6, the second embodiment differs from the first embodiment in that the expansion process region 135 is provided. Thus, the operation of the expansion process section 135 alone will be described with reference FIG. 7.

In the expansion process section 135, the filtering section 171 calculates the maximum value MAX of the 5×5 pixel region surrounding the pixel of interest with respect to the color signal input from the black signal generating section 133, and outputs the calculation result to the calculation section 172.

Based on the maximum value MAX input from the filtering section 171, the constant k preset for the color signal, and the signal value D of the pixel of interest, the calculation section 172 calculates A=k×MAX+(1−k)×D, and delivers a calculation result A to the selector section 173.

In accordance with the recognition signal from the third recognition section 143, the selector section 173 selects one of the calculation result A from the calculation section 172 and the value of the pixel of interest, and outputs the selected result to the tone processing section 173.

As has been described above, according to the embodiments of the present invention, the black character recognition of the present invention and the conventional black character recognition are combined, and it is possible to determine whether the peripheral portion of the character is a white portion or a background with a density of a predetermined value or more.

In accordance with the recognition result, the conversion process for the black character region is switched, thereby enhancing the image quality of the black character.

Specifically, a black character portion on a white background is converted to a single black color, and thus the CMY color signals of the black character portion are reduced to "0". Thus, color blur due to chromatic displacement can be prevented.

As regards the black character portion on the background, the CMY color signals are left on the black character portion by the UCR process conversion. Thereby, white bordering (white edge portion) due to chromatic displacement can be prevented.

The same advantage can be obtained by performing the same recognition as mentioned above and modifying the subsequent process. As regards a black character portion of a color image, the following process is switched after the process of conversion to a single black color. Thereby, the image quality of the black character can be enhanced.

Specifically, as regards the black character region on the white background, color signals are output as such. As regards the black character region on the background, the maximum value (MAX) of the signal values of the peripheral pixels of the CMY color signal alone is output. Thereby, the value of the CMY color signal of the peripheral pixels is output with respect to the edge of the black character region on the background, and the white bordering (white edge portion) due to chromatic displacement can be prevented.

What is claimed is:

1. An image processing apparatus for processing a color image signal input by reading a color image on an original, the apparatus comprising:
   color conversion means for converting the color image signal into color signals;
   first recognition means for recognizing a character or a line image region in the color signals output from the color conversion means;
   second recognition means for recognizing continuous low-density regions in the color signals output from the color conversion means;
   third recognition means for outputting a recognition signal by synthesizing a recognition result of the first recognition means and a recognition result of the second recognition means;
   filter means for filtering the color signals output from the color conversion means, in response to the recognition signal output from the third recognition means;
   black signal generating means for generating a black signal, which is to be added to the color signals filtered by the filter means, in response to the recognition signal output from the third recognition means; and
   tone processing means for processing tones of the color signals, to which the black signal has been added, in response to the recognition signal output from the third recognition means.

2. An image processing apparatus according to claim 1, wherein the second recognition means comprises:
   hue determination means for determining whether the color signals are associated with a low-density portion or a high-density portion, and whether the color signals are associated with an achromatic color or a chromatic color;
   main scan count means for counting up low-density region pixels in a main scan direction on the basis of a determination result of the hue determination means;
   sub-scan count means for counting up low-density region pixels in a sub-scan direction, on the basis of a determination result of the hue determination means; and
   determination means for determining whether a scanned region is a low-density region, on the basis of a count result of the main scan count means and a count result of the sub-scan count means.

3. An image processing apparatus according to claim 1, wherein the black signal generating means comprises:
   GCR process means for subjecting the color signals to a GCR (Gray Component Replacement) process;
   UCR process means for subjecting the color signals to a UCR (Under Color Removable) process;
   black 1 color process means for subjecting the color signals to a black 1 color process; and
   selector means for selecting one of:
   (i) color signals output from the GCR process means;
   (ii) color signals output from the UCR process means; and
   (iii) a black color signal output from the black 1 color process means, said selecting being executed in response to the recognition signal output from the third recognition means.

4. An image processing apparatus for processing a color image signal input by reading a color image on an original, the apparatus comprising:
   color conversion means for converting the color image signal into color signals;
   first recognition means for recognizing a character or a line image region in the color signals output from the color conversion means;
   second recognition means for recognizing continuous low-density regions in the color signals output from the color conversion means;
   third recognition means for outputting a recognition signal by synthesizing a recognition result of the first recognition means and a recognition result of the second recognition means;
   filter means for filtering the color signals output from the color conversion means, in response to the recognition signal output from the third recognition means;
   black signal generating means for generating a black signal which is to be added to the color signals filtered by the filter means, in response to the recognition signal output from the third recognition means;

expansion processing means for expanding a black character region with respect to the color signals, to which the black signal has been added, and selectively outputting the color signals in response to the recognition signal output from the third recognition means; and tone processing means for processing tones of the color signals, to which the black signal has been added, in response to the recognition signal output from the third recognition means.

5. An image processing apparatus for processing a color image signal input by reading a color image on an original, the apparatus comprising:

a color conversion unit configured to convert the color image signal into color signals;

a first recognition unit configured to recognize a character or a line image region in the color signals output from the color conversion unit;

a second recognition unit configured to recognize continuous low-density regions in the color signals output from the color conversion unit;

a third recognition unit configured to output a recognition signal by synthesizing a recognition result of the first recognition unit and a recognition result of the second recognition unit;

a filter unit configured to filter the color signals output from the color conversion unit, in response to the recognition signal output from the third recognition unit;

a black signal generating unit configured to generate a black signal, which is to be added to the color signals filtered by the filter unit, in response to the recognition signal output from the third recognition unit; and a tone processing unit configured to process tones of the color signals, to which the black signal has been added, in response to the recognition signal output from the third recognition unit.

* * * * *